QUOTATION BOARD SYSTEM

INVENTORS
ANTHONY J. SABULSKY
ROBERT H. POTE
BY
ATTORNEYS

INVENTORS
ANTHONY J. SABULSKY
ROBERT H. POTE
BY
ATTORNEYS

INVENTORS
ANTHONY J. SABULSKY
ROBERT H. POTE
BY
Pennie Edmonds Morton Taylor & Adams
ATTORNEYS

QUOTATION BOARD SYSTEM

Filed Feb. 10, 1967 5 Sheets-Sheet 4

INVENTORS
ANTHONY J. SABULSKY
ROBERT H. POTE
BY Rennie Edmonds Morton Taylor & Adams
ATTORNEYS INVENTORS
ANTHONY J. SABULSKY
ROBERT H. POTE
BY
Pennie Edmonds Morton Taylor Adams
ATTORNEYS United States Patent Office 3,418,635
Patented Dec. 24, 1968

3,418,635
QUOTATION BOARD SYSTEM
Anthony J. Sabulsky, Stratford, and Robert H. Pote, Pitman, N.J., assignors to Ultronic Systems Corp., Pennsauken, N.J., a corporation of Delaware
Filed Feb. 10, 1967, Ser. No. 615,147
5 Claims. (Cl. 340—154)

ABSTRACT OF THE DISCLOSURE

A system for receiving updating messages having coded stock identification and price sections, determining coincidence of this identification with a coded combination at each stock display section and thereupon updating the associated price section, in which removable inserts bear stock identification characters in display position thereon and corresponding coded means (e.g. projections) which cooperate with similar sets of means (e.g. sets of switches) at each stock character location to produce coded combinations corresponding to the characters displayed by the inserts.

*Cross-references to related application*

This is an improvement on the quotation board system described in application Ser. No. 542,057 filed Apr. 12, 1966 by Gertler et al.

*Background of the invention*

This invention relates to quotation board systems for the display of prices of stocks, commodities and the like.

The above-identified application describes quotation board systems which display one or more categories of stocks, bonds, commodities, warrants, etc. so that brokers and their customers may be kept informed. For convenience only the term "stocks" will usually be used hereinafter, and it will be understood to include these various kinds of property.

The quotation boards contain a considerable number of stock sections each displaying the stock identification characters by which the stocks are customarily identified. Each location also contains one or more associated price sections for displaying the price(s) of the stock identified thereat. Updating messages are transmitted from a central location by suitable communication lines to the quotation board locations. Each message has a coded stock identification section and a coded price section, and usually contains a coded price category identification. Commonly messages cover many more stocks and price categories than are likely to be used at any one quotation board installation. Provision is made at each installation to select from the train of messages those which can be used at that installation, and to enter the price in the proper position on the board.

Means are provided for enabling a broker to change the stocks displayed on his quotation board, by manually changing the stock identification characters at any board location, with associated means for simultaneously changing the coded combinations which recognize the stock messages to be displayed at that location. Coincidence circuits are provided for determining coincidence between a mesage stock identification and the coded combination at a board stock identification section. Upon coincidence, the price section of the corresponding message is used to change the displayed price in the associated price section for that stock.

The means provided for this purpose are so-called alpha sub-modules, each having an endless belt carrying all the individual characters customarily used for identification of stocks and the like. This endless belt is manually rotatable to display any desired stock character. The endless belt mechanism is coupled to a group of cams and switches which produce different coded combinations as different characters are brought into view at the front of the sub-module. Four of these sub-modules are arranged in a module at each stock location so that all combinations of characters now in common use for stock identification can be displayed.

While these sub-modules have been found satisfactory in use, they represent a substantial part of the total cost of the quotation board.

*Summary of the invention*

The present invention provides a much simpler and less expensive alpha module which markedly reduces the overall cost of the quotation board, while at the same time allowing the broker to change the stock designations and simultaneously change the coded combinations in a convenient manner. Removable inserts are employed bearing stock identification characters in display position thereon. Each character location on the board is adapted to receive and retain a removable insert. Similar sets of means are provided at the character locations for cooperating with coded means on the removable inserts to establish the proper coded combinations. The coded means on the removable inserts are coded in accordance with the characters displayed thereon so as to establish different coded combinations for different displayed characters.

In the specific embodiment described hereinafter, similar sets of switches are mounted at respective character locations and the removable inserts are provided with coded projections which actuate one or more switches in a set to produce the proper coded combination for the character displayed by the insert. The sub-modules are arranged in units of four, and one unit is located at each stock identification section of the board. The detailed construction is adapted to permit inserting and removing the inserts in a simple manner, while insuring proper alignment of the inserts with respective sets of switches.

*Description of the preferred embodiment*

Figure 1:
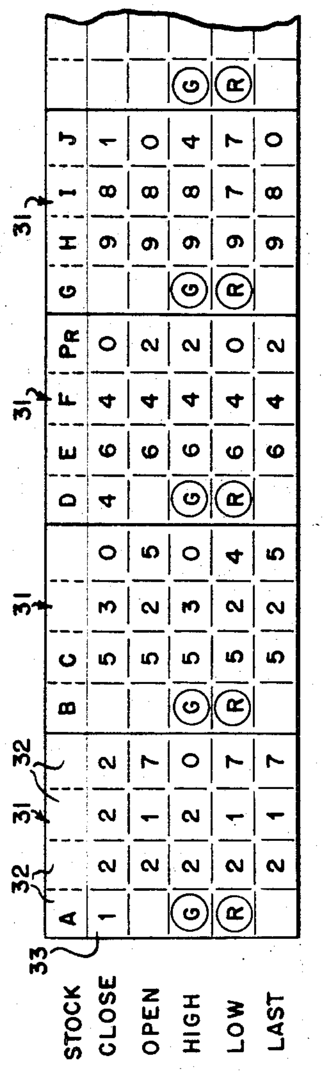
FIGS. 1 and 2 show face views of Full Range and Last Sale quotation boards, respectively.
Figure 5:
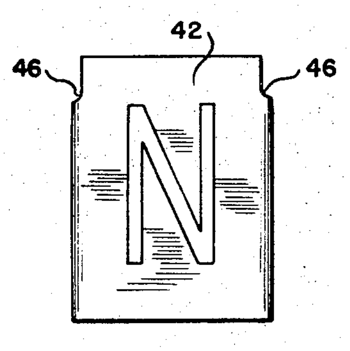
FIGS. 5, 6 and 7 are front, rear and end views of a removable insert.

Referring to FIG. 1, a portion of a so-called Full Range board is shown, having a desired number of stock locations 31. At the top of each location is a Stock row containing four alpha sub-modules 32 which display the identification characters of the stock whose prices are given below. Four numeric sub-modules 33 are in the row designated Close at each location, and give hundreds, tens, units and fractions of that price. The rows designated Open, High, Low and Last each contain three numeric sub-modules for corresponding prices, the hundreds digit being omitted as unnecessary. Green and red lamps G, R light up when a new high or new low is received. The letters in the Stock row are on individual inserts as shown in FIG. 5, described hereinafter, and may be selected to display any desired stock identification. Changing the letters automatically causes the prices of the newly-selected stock to be displayed in the associated price sections the next time information on the new stock is received.

Figure 2:
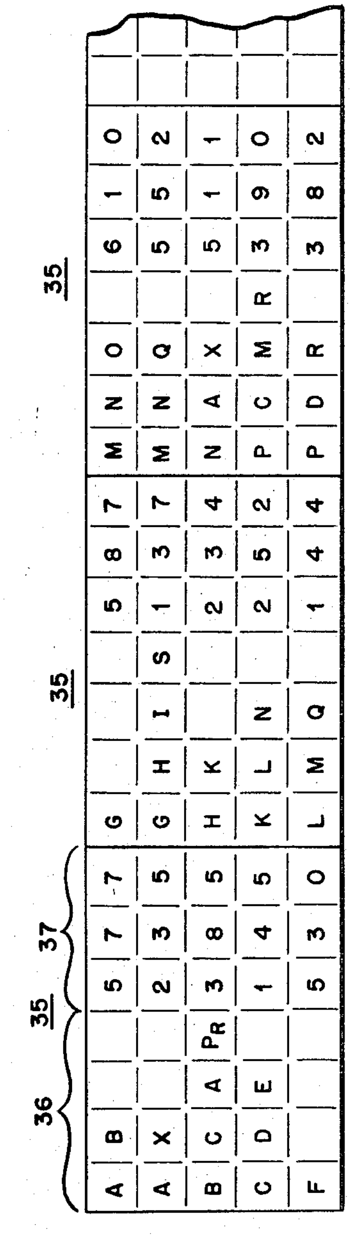

FIG. 2 shows a portion of a so-called Last Sale board having sections 35. In each section the Last prices of five different stocks are displayed in corresponding rows. The first four columns 36 display the identification characters of the selected stocks on individual inserts as in FIG. 1. The last three columns 37 display the corresponding Last prices in tens, units and fractions. Hundreds are omitted as unnecessary, since the broker will be aware of the appropriate price range.

Figure 3:
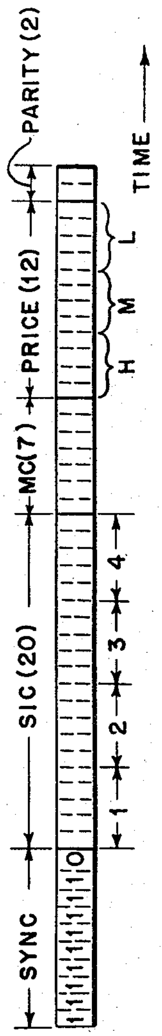
FIG. 3 shows a suitable message format.

FIG. 3 shows one type of message which can be used to supply information to the quotation board, and is a composite of the two specific types of messages shown in the above-identified application. The message starts with an identifying sync pattern specifically shown as nine 1-bits followed by a 0-bit. This is followed by a 20-bit SIC (Stock Identification Code) section which accommodates four 5-bit sections for up to four alpha characters identifying the stock. A 7-bit MC (Message Code) section serves to identify the category of the message (Close, Open, High, etc.). This is followed by a 12-bit Price section sufficient for three BCD (Binary Coded Decimal) digits denoted H, M, L for the High, Medium and Low. Throughout the day, when hundreds are not normally transmitted, these correspond to tens, units and fractions. To transmit hundreds, a special code is inserted in the MC section and the coded digit placed in the H position of the Price section. The message ends with a 2-bit parity section. Further details are given in the above-identified application, but are omitted here since they are not necessary for an understanding of the present invention.

Figure 4:
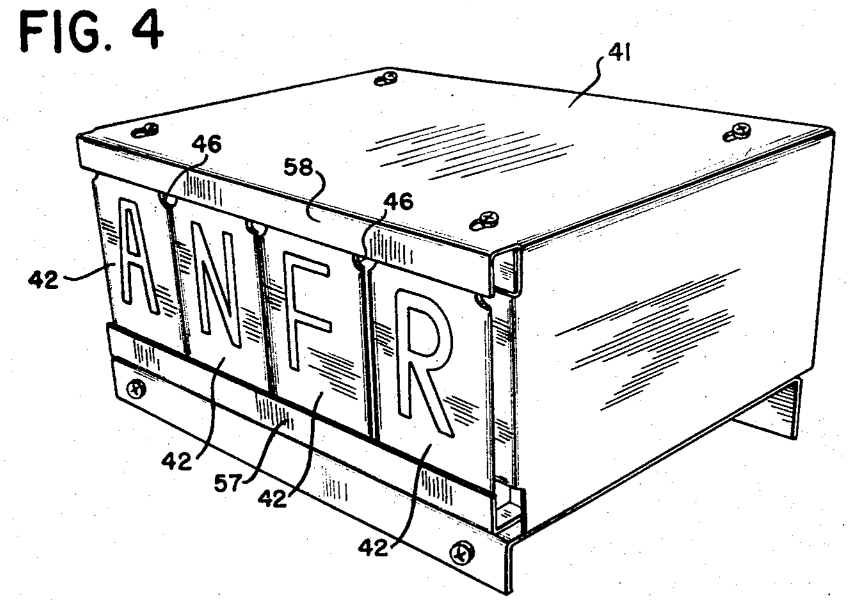
FIG. 4 is a perspective view of an alpha module containing four sub-modules.

FIG. 4 shows a module unit 41 designed to accommodate four sub-modules which receive and retain individual inserts 42. Each insert has a letter character on the face thereof which is the character displayed to the stockbroker, customer, etc. The broker may keep on hand a collection of inserts so that any desired characters may be placed in any desired stock identification section of either of the boards of FIGS. 1 and 2.

Figure 6:
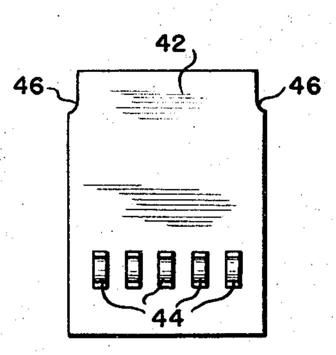
Figure 7:
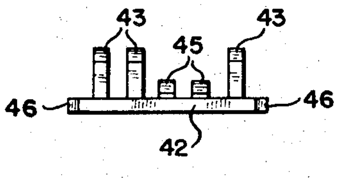

Referring to FIGS. 5–7, each insert is a flat plate having a suitable character on the front face thereof, and projections 43 on the rear face thereof. In this embodiment a five-place code is used, and five specific positions 44 are assigned. Projections 43 are arranged in various combinations corresponding to the character displayed on the face of the insert. With five positions, thirty-two coded combinations are available. This is sufficient for all alphabetic characters plus a few special characters used in connection with commodities, etc. As shown in FIG. 7, there are small projections 45 between the active projections 43. This is for convenience in manufacture, and they may be omitted if desired. Advantageously the insert is made of plastic by a suitable molding operation. Recesses 46 are formed in the upper corners of the insert to assist in properly positioning the inserts in the holder, as will be described.

Many stocks do not require four characters, and in such case blank inserts are placed in the unused character locations. In the particular code used, such blanks are provided with projections 43 in all five positions 44, corresponding to all 0-bits in sections 2, 3 or 4 of the SIC section of the message in FIG. 3.

Figure 8:
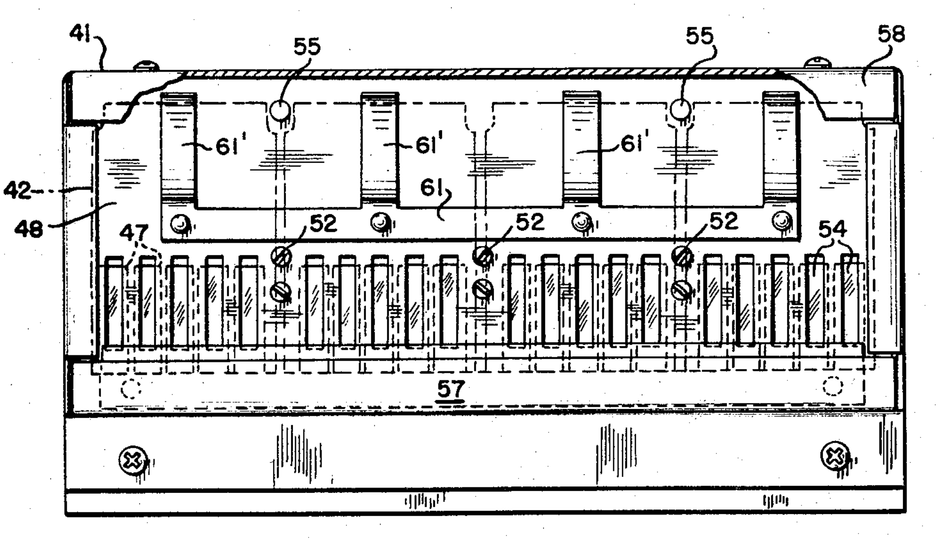
FIGS. 8 and 9 are front and side views of the module of FIG. 4, with parts broken away to show the internal construction.
Figure 9:
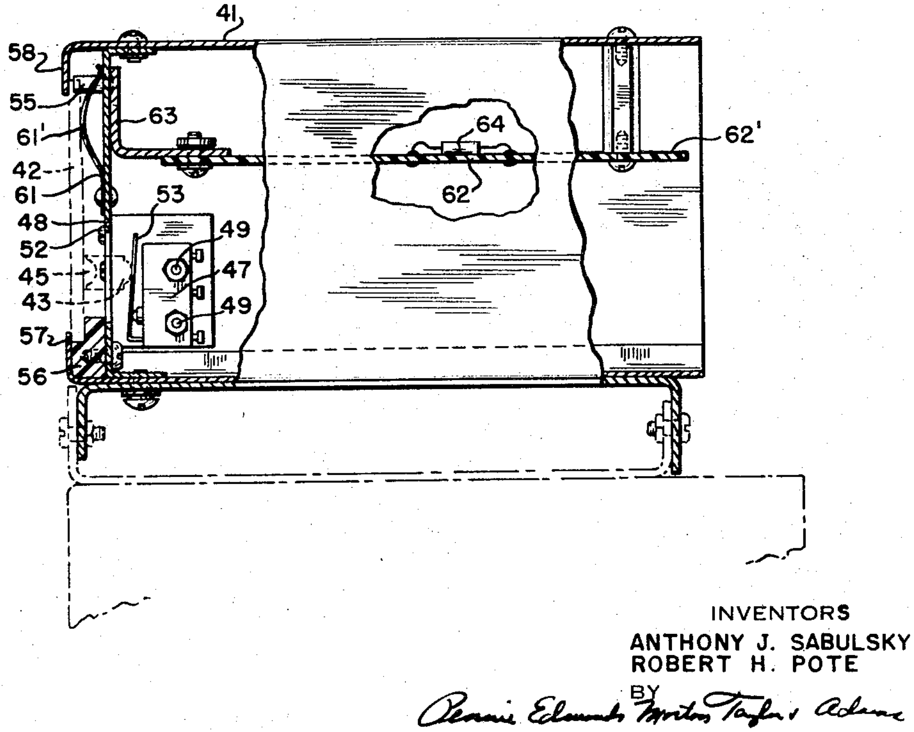
Figure 10:
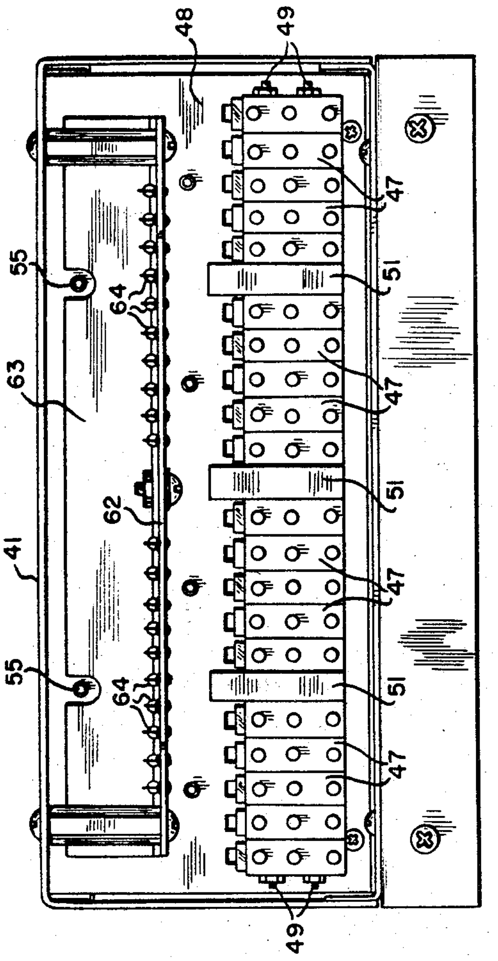
FIG. 10 is a rear view of the module, with wires omitted to avoid obscuring the construction.

Referring to FIGS. 8–10, the inserts 42 are indicated by dot-dash lines. Four similar sets of switches 47, with five switches in each set, are mounted on a panel 48. Conveniently, as shown in FIG. 10, the assembly of switches is held together by long bolts 49, with spacers 51 between sets of switches, and the spacers are attached to the panel 48 by screws 52 (FIG. 8). The switches are so-called micro-switches each having an actuating lever arm 53 (FIG. 9). The panel 48 has slots 54 therein, in alignment with the switch levers 53, so that the projections 43 of the inserts pass through respective slots to actuate the switches. Hence panel 48 serves as a guide plate which helps to insure proper positioning of the inserts. Pins 55 are mounted on the panel 48. Recesses 46 of the inserts are dimensioned to fit around pins 55, thereby further insuring proper positioning of the inserts.

The panel 48 is provided with a strip 56 along the bottom edge thereof which, with upturned lip 57 of the housing, forms a channel to receive the bottom edges of the inserts. A turned down lip 58 at the top of the housing forms a channel receiving the upper ends of the inserts. Sufficient clearance is provided at the top to allow an insert to be slid upwards into position and then moved down into the lower channel. A spring member 61 is provided with bowed spring sections 62 which bear against the rear faces of the inserts and hold them in position against lips 57 and 58. The spring bias of switch arms 53 assist in this action.

Figure 12:
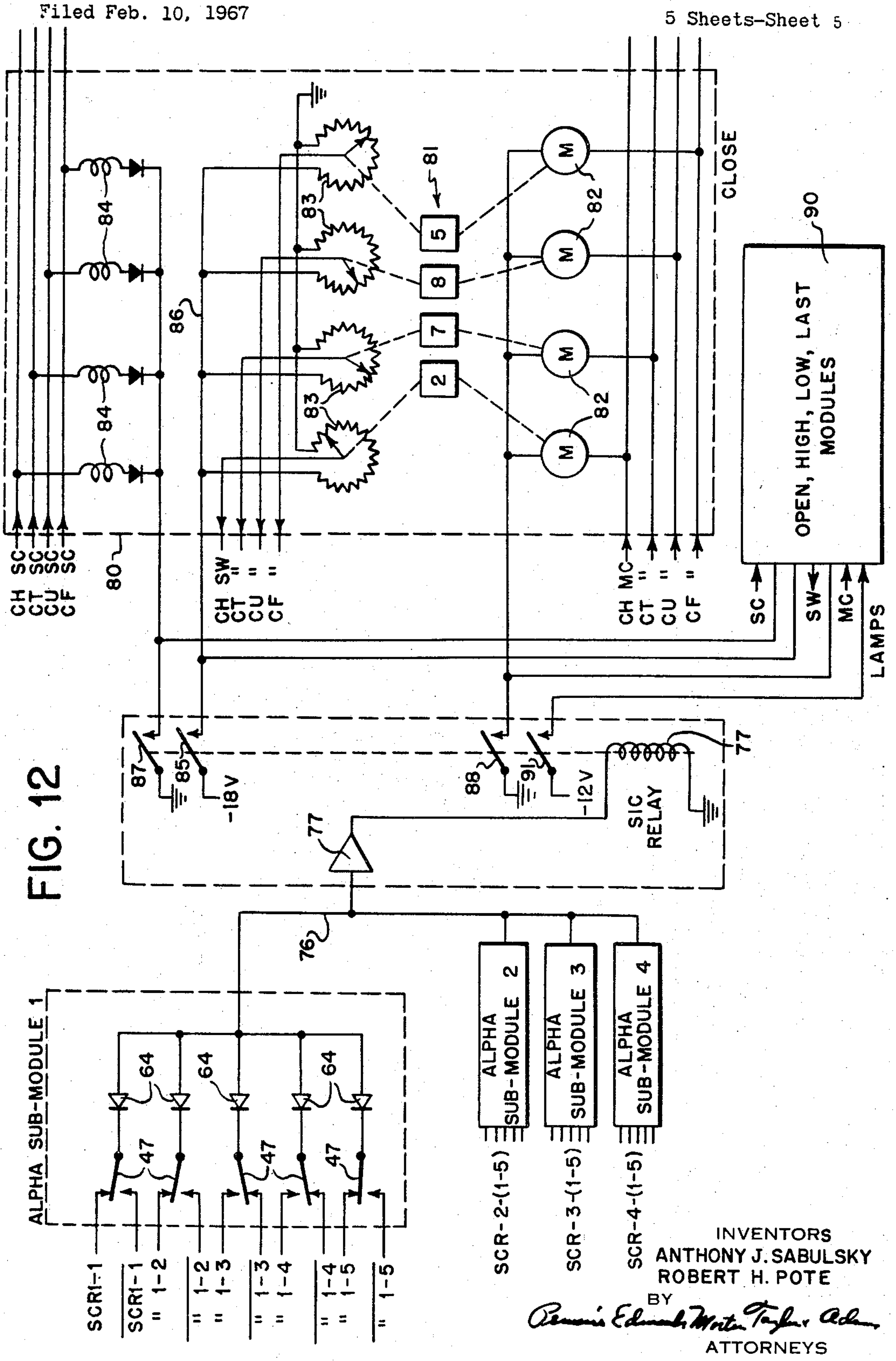
FIG. 12 is a schematic diagram of the board module control circuits.

A printed circuit board 62 is attached to bracket 63 spot-welded to panel 48. Conductors are formed on the upper and lower surfaces of board 62 to provide connections from the switches to respective contacts at the rear end 62' of the board. These are not shown in FIGS. 8–10, but the connections are shown in FIG. 12. As described hereinafter in connection with FIG. 12, a diode is placed in series with each switch arm, and these are conveniently mounted on the printed circuit board as shown at 64.

Figure 11:
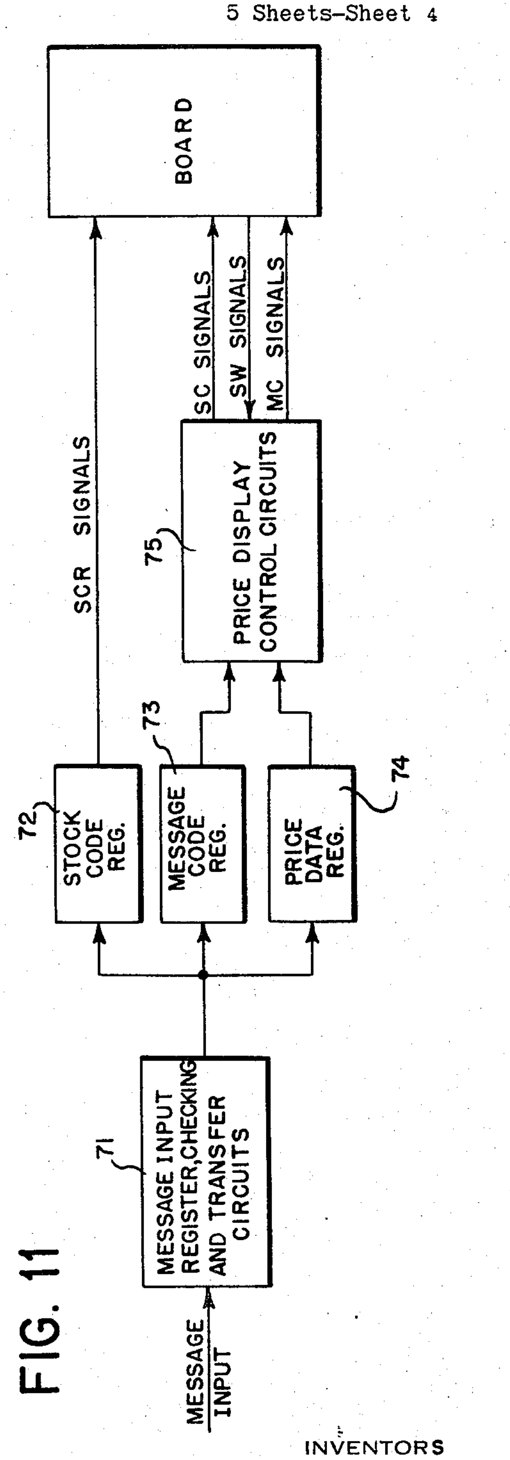
FIG. 11 is an overall block diagram of the system.

Referring ot FIG. 11, input messages from a message center are supplied to block 71 containing a message input register and suitable checking and transfer circuits as described in detail in the above-identified application. After the message has been checked for accuracy and useability, the SIC portion of the message (FIG. 3) is stored in register 72, the MC portion is stored in register 73, and the price portion is stored in register 74. SCR signals from register 72 are supplied to the quotation board for comparison with the coded combinations in the different stock identification sections, as will be described. The contents of registers 73 and 74 are supplied to block 75 containing price display control circuits which develop suitable signals for changing the prices on the board. Specifically, SC and MC signals are developed. SW signals from the board give existing positions of the numeric sub-modules.

Referring now to FIG. 12, board module control circuits are shown for a Full Range Board. The circuits are similar to those described in detail in the above-cited application, and only the overall functioning will be given here. The arrangement of FIG. 12 is repeated at each stock position of the board.

Alpha sub-modules 1–4 form the module 41 of FIG. 4. Each sub-module contains five switches 47 as described in connection with FIGS. 8–10. The switch positions are determined by the coded projections on inserts 42, as already described, and are here shown in an arbitrary combination. A diode 64 is in series with each switch arm, and the outputs of all diodes are connected together and to line 76 leading to amplifier 77.

The inputs SCR 1—1 through SCR 1–5, SCR 2 (1–5), etc., and the corresponding barred signals, come from the stock code register 72 of FIG. 11. The unbarred signals correspond to the coding in the SIC section of the message of FIG. 3. Barred signals are the inverse of the corresponding unbarred signals. As previously described, each SIC section 1 through 4 contains five bits. These are various combinations of 1-bits and 0-bits representing the respective alpha character. The SCR outputs of register 72 bear the same coding relationship. It will here be assumed that an unbarred SCR signal means that its assertion level is high, and a barred signal that its assertion level is low. It will further be assumed that a high unbarred level signal (say, ground) corresponds to a 1-bit, and a low level unbarred signal (negative to ground) corresponds to a 0-bit. The barred signals will have the opposite relationship.

The diodes 64 in the four sub-modules together form a gate such that, if all inputs are high (ground) line 76 will be high, and the switch settings are arranged so that this corresponds to SIC recognition, that is, coincidence of the message SIC with the coded combinations established by the four inserts at the module. If the input to any one or more of diodes 64 is low, line 76 will be low, indicating lack of coincidence of message SIC with that of the module. Amplifier 77 is designed so that a high level in line 76 will actuate SIC relay 77. This closes the associated switch contacts.

Box 80 shows the control of the Close price section of the board. The numeric sub-modules used in the price sections have endless belts with numerals displayed thereon, as indicated at 81, each endless belt being driven by an associated motor 82. Potentiometers 83 are coupled to the drive mechanism so that the resistance to ground varies wtih the displayed numeral. Solenoids 84 are associated with respective endless belt mechanisms and actuate detents (not shown) which insure that the endless belts will stop in the proper positions to fully display the proper numerals.

When SIC relay 77 is energized, switch 85 is closed and applies −18 volts through line 86 to potentiometers 83. Accordingly output signals SW are developed whose voltages are proportional to the settings of the respective potentiometers. The legends CH, CT, CU and CF correspond to Close Hundreds, Close Tens, Close Units, and Close Fractions for the Close position of the Full Range board.

As described in the above-identified application, the incoming price signals are compared with the SW signals, and any departure therefrom determined. The direction of departure is also determined. Then, SC signals are developed to release one or more of solenoids 84 where a change of numeral is required, and the associated motors 82 are supplied with MC signals to drive the respective numeric sub-modules until the proper positions are reached.

Switches 87 and 88 are closed by relay 77 to complete the circuits for the SC and MC signals. Box 90 contains four arrangements like box 80, except that the hundreds digit and associated circuits are omitted. Switch 91 applies −12 volts to the green and red lamps in the High and Low positions so that they can be lighted if a new High or a new Low price is inserted in these positions.

It will be seen that none of the numeric sub-modules can be actuated until the SIC has been recognized. When it is, the numeric sub-modules are enabled for actuation as required to display new prices.

The Last Sale board shown in FIG. 2 contains SIC recognition circuits like that shown in FIG. 12, for each stock position, and solenoids, rotary switches and motors like the Last Sale positions on the full range board.

If the settings of switches 47 in the sub-modules 1–4 are changed by changing the inserts, the former SIC will no longer be recognized. As soon as a message with the new SIC is received, the price therein will be entered in the proper section of the board. To avoid temporary display of prices on the previous stock which will be erroneous for the new stock, the inserts are advantageously changed at the end of the day, so that correct prices will be displayed at the beginning of the next day.

From the preceding description, it will be apparent that the new alpha modules allow very convenient change of displayed stock characters and respective coded combinations, while being much simpler and less expensive than apparatus previously used for this purpose.

In the specific embodiment the inserts nave coded elements projecting from the rear face thereof and actuate self-contained switches in the sub-modules. This is found to be highly reliable and free from difficulties such as improper positioning, establishing erroneous coded combinations, etc. However, if desired, and within the broader aspects of this invention, other specific coded means could be provided on the inserts and the similar sets of means at character locations arranged to cooperate therewith to establish the proper coded combinations for the characters displayed.

We claim:

1. In a stock quotation board system for stocks, commodities and the like including means for receiving quotation messages having a coded stock identification section and a price section, a quotation board having a plurality of stock identification sections for displaying the stock identification characters of selected stocks and associated price sections for displaying the respective prices, each stock identification section having a plurality of character locations, coding means at respective stock identification sections for producing respective coded combinations corresponding to the stocks displayed thereat and manually-operable means for changing the displayed stock characters and corresponding coded combinations simultaneously, means for determining coincidence between a message stock identification and said coded combination at a board stock identification section, and means responsive to said coincidence and the price section of the corresponding message for changing the displayed price in an associated board price section, the improvement in said coding means and manually-operable means which comprises means at said character locations for receiving and retaining removable inserts having stock identification characters in display position thereon, and similar sets of means at said character locations for cooperating with coded means on said removable inserts to establish said coded combinations, said coded means on the removable inserts being coded in accordance with the characters displayed thereon to establish different coded combinations for different displayed characters.

2. Apparatus in accordance with claim 1 in which said similar sets of means are similar sets of switches mounted at respective character locations, and the means on the removable inserts are projections adapted to actuate respective switches, said projections being arranged in different combinations of switch positions to actuate different combinations of switches for different characters displayed by the inserts.

3. Apparatus in accordance with claim 2 in which said inserts are substantially flat plates having respective characters on the front faces thereof and said projections on the rear face thereof, and including a guard plate in front of said switches having slots therein allowing entry of said projections.

4. Apparatus in accordance with claim 3 including channels at the top and bottom of the character locations for receiving said inserts, and spring means positioned to press the inserts against the forward sides of said channels.

5. Apparatus in accordance with claim 4 in which the upper corners of said inserts are recesses, and including a pin between a pair of inserts around which said recesses fit.

References Cited

UNITED STATES PATENTS 3,061,816 10/1962 Reynolds ---------- 340—147

EUGENE G. BOTZ, *Primary Examiner.*

U.S. Cl. X.R.

340—187, 317, 324